June 2, 1953  J. T. PARISI  2,640,977
LEVEL INDICATOR OPERATED BY AIR PRESSURE
Filed Nov. 27, 1951
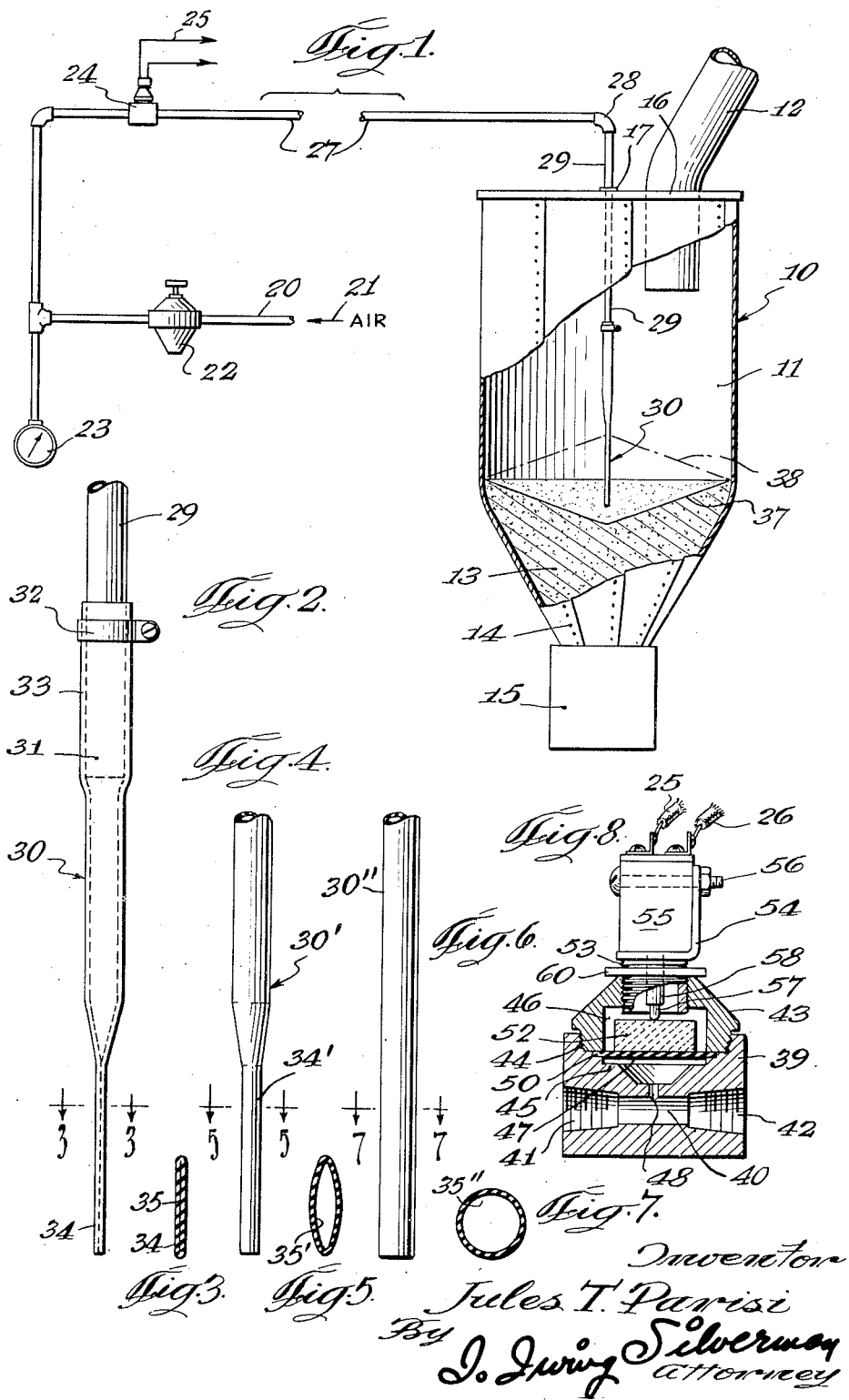
Inventor
Jules T. Parisi
By I. Irving Silverman
Attorney Patented June 2, 1953

2,640,977

UNITED STATES PATENT OFFICE 2,640,977

LEVEL INDICATOR OPERATED BY AIR PRESSURE

Jules T. Parisi, Chicago, Ill.

Application November 27, 1951, Serial No. 258,366

12 Claims. (Cl. 340—246)

This invention relates generally to means for indicating the level at which a quantity of granular material stands in a storage bin and more particularly is concerned with level indicating means of the character described which is operated by air pressure. In addition, the invention is adapted for use in controlling the level by causing the addition of material when required in order to maintain said level at which said material stands in the bin. The invention is especially adapted for use in connection with the feeding of molding sands employed in large foundries.

In various industries, such as the grain and foundry industries, granular material of various consistencies is stored in bins, the material usually having been loaded into the bin through the upper end thereof and arranged to be withdrawn from the lower end for use when desired. With respect to the process of molding metal castings in large foundries, the molding sand required by the workmen may be supplied from storage bins in this manner. In order to insure that an adequate supply of granular material is maintained in the bins, heretofore, various electrical means have been provided either directly in the bin, or in near proximity thereto, for indicating that the quantity of material standing in the bin is at a predetermined maximum level, or that through continued depletion, has receded below a predetermined minimum level and should be replenished promptly before it is exhausted.

As stated above, the various level indicating means heretofore known and used have consisted mainly of electrical devices mounted either directly in the storage bin or in near proximity thereto. Such means have included various devices which are sensitive to changes in level of the granular material in the bin and which when actuated, serve to open or close certain electrical switches connected in a circuit or circuits to level indicator means, which thereupon serves to indicate the level of the granular material in the bin. Although such heretofore known means have been used widely, they all have caused certain aggravated and dangerous conditions to exist.

The dangerous conditions alluded to above are due mainly to the nature of the said granular material. Such material in most cases includes, and in many cases comprises very finely divided or minute particles which form cloud-like mixtures with the air in the storage bins. The mixtures may result either when the granular material is loaded into the said bins or as the material is standing in the bin and being depleted. In either event, such mixtures of air and finely divided granular material are highly explosive and the use of electrical equipment in such a media or in close proximity thereto gives rise to a potentially dangerous condition. Any inadvertent sparking or overheating of the electrical indicating equipment likely could and has resulted in such explosions with the resultant loss in lives and property.

Accordingly, it is a primary object of the invention to provide level indicating means of the character described which will eliminate entirely the possibility of explosions of such mixtures in storage bins containing granular materials due to electrically operated equipment.

Another object of the invention is to provide level indicating apparatus of the character described having novel means for indicating automatically that granular material in a storage bin stands at least at a predetermined level or has been depleted until the level of such material stands below said predetermined level.

Another object of the invention is to provide novel level indicating means operated by air pressure.

Still another object of the invention is to provide a novel actuating element in level indicating means of the character described for engagement with said granular material and adapted to actuate indicator means in response to said material standing at a level equal to or below a predetermined level; and which actuating element is made of rubber-like substance so as to remain unaffected by the corrosive action of vapors given off by such granular materials, as in the case of molding sands.

Still another object of the invention is to provide a device of the character described which includes a collapsible depending member with a passageway having communication with an air system, and which permits leakage of air through the passageway but which, when collapsed through engagement thereof with the granular material being stored, will prevent air leakage thereby raising the pressure in the system.

Other objects of the invention lie in the provision of novel level indicating means operated by air pressure which is economical to make and install; is sturdy and durable and simple and easy to operate and maintain; in which a portion of said means utilizing electrical apparatus is adapted to be disposed at a point remote from the storage bin so as to eliminate the possibility of explosions therein and in which the actuating element is operative by air pressure inside said storage bin.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a schematic diagram of level indicating apparatus constructed in accordance with my invention, same being shown associated with a storage bin and chute for feeding granular material to the bin.

Fig. 2 is a side elevational view of the actuating element of my invention.

Fig. 3 is a sectional view taken through said element along the line 3—3 of Fig. 2 and in the direction indicated.

Fig. 4 is a side elevational view of a modified form of the actuating element.

Fig. 5 is a sectional view taken through the said element along the line 5—5 of Fig. 4 and in the direction indicated.

Fig. 6 is a side elevational view of another modified form of actuating element constructed in accordance with my invention.

Fig. 7 is a sectional view taken through the said element along the line 7—7 of Fig. 6 and in the indicated direction.

Fig. 8 is an elevational view of the air switch associated with the actuating element of my invention and having portions thereof in section showing constructional details.

In the process of molding metal castings, the molding sands may be supplied from bins such as shown in Fig. 1. The reference character 10 designates generally such a storage chamber 11 formed between the confining walls thereof. The molding sands is loaded into the bin 10 through the upper portion thereof by means of a chute 12, and thereafter falls by gravity to the lower portion of the bin at 13. Said sands are thereafter withdrawn from the lower portion of the bin as needed, said lower portion possibly being defined by a downwardly tapered side wall 14 so as to facilitate withdrawal of the sand into a mixing vessel, dispensing device, or any other receiving means 15. The upper portion of the bin 10 may be provided with a cover member 16 having a suitable opening for receiving therein the chute 12 and another opening in the form of a pipe union 17 for accommodating the indicating means hereinafter described.

It is necessary to insure that the supply of material in the storage bin remain adequate and for this purpose, there have heretofore been provided various indicating devices for determining whether the granular materials have been depleted below a predetermined level and should be replenished before it is exhausted. It is the object of this invention to provide such indicating apparatus, the apparatus herein described being operative in a manner which does not require the use of electrical equipment in the bin 10 or in near proximity thereto, thereby eliminating completely the possibility of explosions due to the detonation of explosive air-granular material mixtures in said bin due to electrical sparks or the like.

Referring to the drawings, in Fig. 1 is illustrated generally my level indicating means operated by air pressure. I provide an air line 20 connected to a source of air (not shown), the air entering said line 20 at one end thereof as indicated by the arrow 21. Said line may be formed of ⅛ to ¼ inch in diameter pipe. I provide an air regulating valve 22 of well-known construction for reducing the air pressure of the incoming air to a lower pressure at which my device is operated. Another advantage of my device lies in the fact that it requires very low pressure. Depending on the nature of the material, the pressures used on the downstream side of the regulator 22 run from about ½ pound to 3 pounds per sq. in. There is also provided an air pressure gauge 23 for indicating the pressure of the air in the line downstream of the regulator 22. Also along said line 20 I provide an air switch 24 which may be adjusted to operate at a given value of air pressure in the line 20. Said switch 24 has a pair of electrical leads 25 and 26 extending therefrom which may be connected to means which may include a motor (not shown) which may be arranged to control the feeding of granular material into the bin 10 from the chute 12. It has not been deemed necessary to show the apparatus for controlling the feeding of granular material from the chute 12 as such constructions are well known and it is desired to keep the description of the invention per se simple and uncluttered with excessive detail.

It will be noted that the line 20 is shown broken as at 27, thus indicating that the switch 24 is intended to be disposed in said line 20 at a point remote from the bin 10. Thus, it should be understood that the switch 24 could even be disposed in a room separate from that in which the bin 10 is kept. In any event, the line 20 is continuous to a point above the bin 10 and thereafter joined by the elbow 28 to a section of line 29 entering the cover 16 of the bin 10 through union 17. The section 29 is of sufficient length to be disposed in the bin 10, but considerably above the lower portion of the bin.

Referring to Fig. 2, there is shown the actuating element of my invention which is designated generally by the reference character 30. Said element is mounted over the free end 31 of the section 29 and secured thereon by means of friction, or if desired a ring clamp 32. Said element 30 consists of an elongate, flexible, collapsible length of rubber tubing having one of its ends 33 secured to the section 29 and its opposite end 34 adapted to be disposed in the chamber 11 at a distance above the lower portion of the bin which corresponds to the desired level for the material in the bin 10. There may be a narrow, slit-like normally-closed passageway 35 through the element 30. Air is intended to seep through the passageway and out the end 34 for the purpose of maintaining the pressure in the line 20 below that required to actuate the switch 24 when the level of the material in the bin is below the desired level. The element 30 is substantially the same in construction as the relief valves of a common type of gas mask. Other constructions will be described in which the passageway 35 is broad and not normally closed, but the operation of which is substantially the same.

In operation, the air switch is set to operate at a given pressure. When the level of the granular material 13 such as shown by line 37 is below the end 34 (in other words, below the desired level of material) the air will bleed out of the end 34, thereby keeping the pressure in the switch 24 down below the operating pressure at which it is set to be thrown. Under such a condition, the switch may have normally closed contacts energizing a circuit to operate a motor which will cause granular material to be fed into the bin 10 from the chute 12, or, the switch 24 could be connected to operate certain other indicating means indicating that the material in the bin 10 is below a predetermined minimum level and requires replenishing.

Upon replenishing the supply of material 13, the level thereof will rise until it exceeds the position of the end 34, said level being shown by the broken line 38. Since the tubing is highly flexible and collapsible, the weight of the granular material around said end 34 will collapse the passageway 35. It may also cause same to curl upon itself also tending to close off the passageway 35 thereby preventing air from bleeding out therethrough. This will cause the air pressure in the line 20 to increase. When this air pressure has reached the pressure at which the switch 34 is set to operate, the switch will be actuated. The switch 24 may be arranged under these circumstances to operate another indicating device for showing that the predetermined level has been reached, or may be set to deenergize the circuit controlling the motor feeding the material to the bin from the chute 12. Thus, it will be appreciated that with the air escaping through the end 34, the air switch 24 will be in one condition and may be arranged to energize means for feeding material into the bin 10. As soon as the predetermined level for the material in the bin is exceeded, a back pressure is built up in the line 20 which causes the air switch 24 to be thrown to a second condition either to operate indicating means or shut off the motor feeding material to the bin.

Referring now to Fig. 8, I have illustrated, merely by way of example a pressure-operated switch suitable for use as the element heretofore designated 24. Switch 24 includes a body 39 adapted to be interposed in the line 20 in airtight connection therewith. An air passageway 40 extends through the bottom portion of the body 39 having suitable threaded ends 41 and 42 for securement to the open ends of the line in the usual manner.

There is a recess formed in the upper portion of the body 39 into which there is engaged a hollow plug 43. The recess is threaded at 44 to receive the plug, and has a reduced diameter portion 45 at the bottom thereof to form a shoulder for a purpose to be explained. The plug 43 and the recess together form a chamber 46 the lower portion 47 of which communicates with the air line passageway 40 by way of a small opening 48. Upper and lower chambers 46 and 47 are separated by means of a flexible diaphragm 50 of rubber or similar material which is stretched across the recess in the body 39 with its periphery overlying the shoulder 45. The act of screwing the plug 43 into position clamps the diaphragm 50 tightly between the two chambers 46 and 47.

Chamber 47 will be at line pressure, but chamber 46 may be at atmospheric pressure so that as the line pressure increases the diaphragm 50 tends to distort upward. A block of light material, such as plastic is shown at 52, resting on the diaphragm and adapted to be moved upward with increase in line pressure.

The top of the plug 43 is screw threaded to receive the nipple 53 which is secured to an angle bracket 54. The bracket 54 has a short-stroke switch 55 of any suitable type mounted thereon.

I prefer a type known by its commercial trademark "Micro-switch." Switch 55 is mounted by bolts 56 to the bracket 54 and has its actuating rod 57 ensheathed in a protecting sleeve 58 which extends through a suitable opening (not shown) in the bottom of the bracket 54. The entire assembly including the bracket and the switch and the nipple is screwed down into the plug 43 until the tip of the rod 57 engages against the top of the block 52. The adjustment of the pressure at which the switch 55 will be actuated depends upon the initial pressure of the end of the rod 57 against the block 52. Any position chosen is locked by a suitable lock nut 60. The leads 25 and 26 previously referred to are shown at the top of the switch secured to terminals thereof.

The operation of the switch should be apparent. Presuming that the level 38 of the material is such that it has closed off the end 34 thereby preventing air from bleeding out, a back pressure will be built up which will be translated through the section 29 and line 20 to exert a force against the under surface of the diaphragm 50. This force will cause the diaphragm to be stretched upwardly thereby moving the spacer member 52 toward the rod 57. At a given back pressure, corresponding to a preadjusted position of the rod 57 the switch 55 will be thrown. As long as air is prevented from bleeding out through the passageway 35, the back pressure built up in the line 20 will be maintained by regulator 22 and switch 55 will remain thrown. As shown in Fig. 8, there is provided a pair of leads 25 and 26 which may be connected either to suitable indicating means or to a circuit controlling a machine for causing granular material to be fed to the bin 10 through chute 12. Under the circumstances above described, naturally the switch could be arranged to shut off such a machine feeding material to the bin.

When the level of the material falls below the end 34 to approximately the level shown at 37, the passageway 35 will be clear, thereby permitting air to bleed out therethrough. The back pressure created in the line will decrease, until it falls below the pressure at which the switch 55 is set to operate. The diaphragm 50 will move back relieving pressure of block 52 against the rod end 57 whereby the switch 55 may be caused to turn on a motor for feeding material into the bin 10. For such operation, the switch 52 could consist of a single pole-double throw switch where one position would result in the switch opening the circuit to a motor or indicator device and the other position closing the circuit thereto. Such circuit arrangements are well known to those skilled in the art.

Referring to Figs. 4 to 6 inclusive, there are shown several modified forms for the tubing or actuating element 30. The embodiment shown in Fig. 4 is designated 30' and is similar in configuration to that shown in Fig. 2. Thus, the element 30' also has a narrowed end portion 34' and an oval-like passageway 35' therethrough. However, the passageway 35' is shown as somewhat larger in cross-section than that of passageway 35 in the element 30. I have found that providing the tubing 30' with a larger passageway does not effect adversely the operation of my invention.

Referring to Figs. 5 and 6, still another embodiment of the said tubing is shown and designated by the character 30''. The tubing 30'' however, is a straight, elongate, circular length of tubing, the pasageway 35'' therethrough being circular and somewhat larger than that of embodiments 30 and 30'. It should be understood that in each of the embodiments of Figs. 2, 4 and 6, the tubing 30, 30' and 30'' respectively is made of flexible and collpasible rubber so that the passageways through each may easily and readily be closed or the tube collapsed through bending by the weight of material reaching level 38 above the lower end of the tube.

It should be understood that the absence of any part of an electrical circuit in the bin 10 means that the tubing 29 may be formed of any material capable of conveying the air to the flexible end portion 30. As a matter of fact, the tubing 29 itself may be formed of rubber and be flexible throughout its length. This is desirable especially where the granular materials may be corrosive in nature. The invention contemplates that the entire tubular assembly from the union 28 into the bin 10 and to the end of the portion 34 can be formed of an integral member, and with great economy of production.

Although not illustrated, it is obvious that a plurality of devices such as described could be installed in a bin with the portions 34 at different levels so that a multiple indication or multiple feeding operation could be accomplished.

It is believed that this invention, its mode of construction and assembly, and many of its advantages should be readily understood from the foregoing without further description, and it should be manifest that while a preferred embodiment of the invention has been shown and described for illustrative purposes, the structural details are nevertheless capable of wide variation within the purview of this invention as defined in the appended claims.

What is claimed and desired to be secured by Letters Patent of the United States is:

1. A device for actuating pressure-operated means indicating the rise or fall of the level of granular material in a storage bin relative to a pre-determined level, said device adapted to be connected into an air line system having said means therein comprising a collapsible, elongate tubular member suspended in said bin and having a passageway for passing air therethrough, said member adapted to be collapsed by the granular material when same rises above said predetermined level whereby to create a back pressure in said line for operating said means to indicate said higher level and permitting air to pass therefrom when the granular material falls below said predetermined level whereby to operate said means to indicate said lower level.

2. A device for actuating pressure-operated means indicating the rise or fall of the level of granular material in a storage bin relative to a pre-determined level, said device adapted to be connected into an air line system having said means therein comprising a collapsible, elongate tubular member suspended in said bin and having a passageway for passing air therethrough, said member adapted to be collapsed by the granular material when same rises above said predetermined level whereby to create a back pressure in said line for operating said means to indicate said higher level and permitting air to pass therefrom when the granular material falls below said predetermined level whereby to operate said means to indicate said lower level, said member being made from a flexible rubber-like material.

3. A device for actuating pressure-operated means indicating the rise or fall of the level of granular material in a storage bin relative to a pre-determined level, said device adapted to be connected into an air line system having said means therein comprising a collapsible, elongate tubular member suspended in said bin and having a passageway for passing air therethrough, said member adapted to be collapsed by the granular material when same rises above said predetermined level whereby to create a back pressure in said line for operating said means to indicate said higher level and permitting air to pass therefrom when the granular material falls below said predetermined level whereby to operate said means to indicate said lower level, said member being made from a flexible rubber-like material, and having an end portion coinciding with the predetermined level with said passageway being constructed at said level.

4. A device for actuating pressure-operated means indicating the rise or fall of the level of granular material in a storage bin relative to a pre-determined level, said device adapted to be connected into an air line system having said means therein comprising a collapsible, elongate tubular member suspended in said bin and having a passageway for passing air therethrough, said member adapted to be collapsed by the granular material when same rises above said predetermined level whereby to create a back pressure in said line for operating said means to indicate said higher level and permitting air to pass therefrom when the granular material falls below said predetermined level whereby to operate said means to indicate said lower level, said member being made from a flexible rubber-like material, and having an end portion coinciding with said predetermined level with said passageway being substantially oval in cross-section at said level.

5. A device for actuating pressure-operated means indicating the rise or fall of the level of granular material in a storage bin relative to a pre-determined level, said device adapted to be connected into an air line system having said means therein comprising a collapsible, elongate tubular member suspended in said bin and having a passageway for passing air therethrough, said member adapted to be collapsed by the granular material when same rises above said predetermined level whereby to create a back pressure in said line for operating said means to indicate said higher level and permitting air to pass therefrom when the granular material falls below said predetermined level whereby to operate said means to indicate said lower level, said member being made from a flexible rubber-like material, and comprising a length of tubing.

6. Apparatus for indicating change in the level of granular material in a storage bin relative to a predetermined level comprising a compressed air line having one end communicating with said bin and its opposite end connected to an air line including a pressure regulating device for reducing the pressure of the incoming air, and an air operated switch for operating a device for indicating the said change in level of the granular material, and means connected to said one end and suspended in the bin at the predetermined level and adapted to have air passed therethrough, said means operating said switch by variation of the pressure of air therein when the material rises above and falls below said predetermined level, said means comprising an elongate, flexible tubular member having a passageway therein, said member adapted to be collapsed by said material when same rises above said predetermined level whereby to create a back pressure in the line sufficient to operate said switch for indicating said higher level, but permitting leakage of air therefrom when said material falls below said predetermined level whereby to operate the switch for indicating said lower level.

7. Apparatus for indicating change in the level of granular material in a storage bin relative to a predetermined level comprising a compressed air line having one end communicating with said bin and its opposite end connected to an air line including a pressure regulating device for reducing the pressure of the incoming air, and an air operated switch for operating a device for indicating the said change in level of the granular material, and means connected to said one end and suspended in the bin at the predetermined level and adapted to have air passed therethrough, said means operating said switch by variation of the pressure of air therein when the material rises above and falls below said predetermined level, said means comprising an elongate, flexible tubular member having a passageway therein, said member adapted to be collapsed by said material when same rises above said predetermined level whereby to create a back pressure in the line sufficient to operate said switch for indicating said higher level, but permitting leakage of air therefrom when said material falls below said predetermined level whereby to operate the switch for indicating said lower level, said member being made from relatively thin, rubber-like material.

8. Apparatus for indicating change in the level of granular material in a storage bin relative to a predetermined level comprising a compressed air line having one end communicating with said bin and its opposite end connected to an air line including a pressure regulating device for reducing the pressure of the incoming air, and an air operated switch for operating a device for indicating the said change in level of the granular material, and means connected to said one end and suspended in the bin at the predetermined level and adapted to have air passed therethrough, said means operating said switch by variation of the pressure of air therein when the material rises above and falls below said predetermined level, said means comprising an elongate, flexible tubular member having a passageway therein, said member adapted to be collapsed by said material when same rises above said predetermined level whereby to create a back pressure in the line sufficient to operate said switch for indicating said higher level, but permitting leakage of air therefrom when said material falls below said predetermined level whereby to operate the switch for indicating said lower level, said member being made from relatively thin, rubber-like material, and having an end portion opening at said predetermined level, said passageway being slit-like in cross section.

9. Apparatus for indicating change in the level of granular material in a storage bin relative to a predetermined level comprising a compressed air line having one end communicating with said bin and its opposite end connected to an air line including a pressure regulating device for reducing the pressure of the incoming air, and an air operated switch for operating a device for indicating the said change in level of the granular material, and means connected to said one end and suspended in the bin at the predetermined level and adapted to have air passed therethrough, said means operating said switch by variation of the pressure of air therein when the material rises above and falls below said predetermined level, said means comprising an elongate, flexible tubular member having a passageway therein, said member adapted to be collapsed by said material when same rises above said predetermined level whereby to create a back pressure in the line sufficient to operate said switch for indicating said higher level, but permitting leakage of air therefrom when said material falls below said predetermined level whereby to operate the switch for indicating said lower level, and having an end portion of oval cross section.

10. In a device for indicating change in the level of granular material in a storage bin relative to a predetermined level including an air pressure system having an air operated switch for operating means indicating said change in level, means adapted to be connected in said system and suspended in said bin coinciding with said predetermined level for operating said switch comprising a collapsible, tubular, rubber member connected to said system and having its open end arranged to determine said predetermined level, and adapted to be closed by said material rising above said predetermined level whereby to cause an increase in the pressure of said system thereby operating said switch to indicate said higher level, said free end permitting bleeding of air therefrom when the material falls below said predetermined level whereby to operate said switch to indicate said lower level.

11. Apparatus for indicating change in the level of granular material in a storage bin relative to a predetermined level comprising a compressed air line having one end communicating with said bin and its opposite end connected to an air line including a pressure regulating device for reducing the pressure of the incoming air, and an air operated switch for operating a device for indicating the said change in level of the granular material, and means connected to said one end and suspended in the bin at the predetermined level and adapted to have air passed therethrough, said means operating said switch by variation of the pressure of air therein when the material rises above and falls below said predetermined level, said means comprising an elongate, flexible tubular member having a passageway therein, said member adapted to be collapsed by said material when same rises above said predetermined level whereby to create a back pressure in the line sufficient to operate said switch for indicating said higher level, but permitting leakage of air therefrom when said material falls below said predetermined level whereby to operate the switch for indicating said lower level, said switch adapted to be arranged in said line at a point remote from said bin.

12. In a device for indicating change in the level of granular material in a storage bin relative to a predetermined level including an air pressure system having an air operated switch for operating means indicating said change in level, means adapted to be connected in said system and suspended in said bin coinciding with said predetermined level for operating said switch comprising a collapsible, tubular, rubber member connected to said system and having its open end arranged to determine said predetermined level, and adapted to be closed by said material rising above said predetermined level whereby to cause an increase in the pressure of said system thereby operating said switch to indicate said higher level, said free end permitting bleeding of air therefrom when the material falls below said predetermined level whereby to operate said switch to indicate said lower level, said switch adapted to be arranged in said system at a point remote from said bin and being adjustable for varying the operating pressure thereof.

JULES T. PARISI.

References Cited in the file of this patent

UNITED STATES PATENTS

| Number | Name | Date |
| --- | --- | --- |
| 1,977,969 | McIntosh | Oct. 23, 1934 |
| 2,331,208 | Ludi | Oct. 5, 1943 |
| 2,398,958 | Pellettere | Apr. 23, 1946 |
| 2,417,988 | Mooney | Mar. 25, 1947 |
| 2,571,378 | Parisi | Oct. 16, 1951 |